(12) United States Patent  
Nojima

(10) Patent No.: US 6,704,518 B2
(45) Date of Patent: Mar. 9, 2004

(54) SIGNAL TRANSMISSION SYSTEM AND SIGNAL TRANSMISSION APPARATUS

(75) Inventor: Kazuhiro Nojima, Yokohama (JP)

(73) Assignee: Matsushita Electric Industrial Co., Ltd. (JP)

( * ) Notice: Subject to any disclaimer, the term of this patent is extended or adjusted under 35 U.S.C. 154(b) by 553 days.

(21) Appl. No.: 09/796,421

(22) Filed: Mar. 2, 2001

(65) Prior Publication Data

US 2001/0021228 A1 Sep. 13, 2001

(30) Foreign Application Priority Data

Mar. 8, 2000 (JP) ........................................ 2000-063205

(51) Int. Cl.⁷ ........................ H04B 10/04; H04B 10/12; H04B 10/00; H04B 17/00
(52) U.S. Cl. ........................ 398/147; 398/161; 398/187; 455/67.16
(58) Field of Search .................... 398/81, 147, 161, 398/183, 127, 192; 455/43, 60, 67.16

(56) References Cited

U.S. PATENT DOCUMENTS

| 4,630,285 A | 12/1986 | Dyer et al. ............... 375/37 |
| 4,673,939 A | 6/1987 | Forrest ...................... 342/174 |
| 6,229,631 B1 * | 5/2001 | Sato et al. .................. 398/30 |
| 6,486,986 B1 * | 11/2002 | Fuse ........................... 398/186 |
| 6,604,871 B2 * | 8/2003 | Cao ............................. 398/158 |

FOREIGN PATENT DOCUMENTS

JP 61-154207 7/1986

* cited by examiner

Primary Examiner—Leslie Pascal
Assistant Examiner—Dalzid Singh
(74) Attorney, Agent, or Firm—Connolly Bove Lodge & Hutz LLP

(57) ABSTRACT

In a signal transmission system made up of a transmission section, a receive section and an optical fiber installed between the transmission section and the receive section, a harmonic producing circuit and a harmonic phase shifting circuit are provided on the downstream side of an FM modulator. The harmonic producing circuit superimposes a harmonic of an FM signal on the FM signal, and the harmonic phase shifting circuit shifts the phase of the harmonic. This arrangement compensates a group delay deviation occurring in system components when an AM signal or QAM signal is modulated into an FM signal or PM signal in a modulator and then transmitted to be demodulated in a demodulator, thereby improving transmission quantity.

19 Claims, 3 Drawing Sheets

SIGNAL TRANSMISSION SYSTEM AND SIGNAL TRANSMISSION APPARATUS

BACKGROUND OF THE INVENTION

1) Field of the Invention

The present invention relates to a signal transmission system in which an AM (Amplitude Modulation, Intensity Modulation) signal or a QAM (Quadrature Amplitude Modulation) signal is transmitted in a state converted into an FM (Frequency Modulation) signal or a PM (Phase Modulation) signal, which in turn, is again converted into the original (former) AM signal or QAM signal on the receive side.

2) Description of the Related Art

Referring to FIG. 3, a description will be given hereinbelow of one example of a conventional signal transmission system based on optical transmission.

In FIG. 3, a signal transmission system is shown with a transmission section 10, an optical fiber (transmission line) 20 and a receive section 30.

The transmission section 10 comprises an FM modulator 11 (modulating means), a first amplifying circuit 12 (first amplifying means) and a semiconductor laser 13 (light-emitting device), located in the order from the upstream side to the downstream side. The receive section 30 comprises a light-receiving device 31, a second amplifying circuit 32 (second amplifying means) and an FM demodulator 33 (demodulating means), located in the order from the upstream side to the downstream side.

In the signal transmission system thus arranged, the FM modulator 11 of the transmission section 10 first converts an AM signal into an FM signal. In this case, the AM signal includes, for example, frequency-division-multiplexed multi-channel video signals.

The first amplifying circuit 12 amplifies this FM signal, and the semiconductor later 13 converts the amplified FM signal from the electric signal form into an optical signal from. The FM signal forming an optical signal arrives through the optical fiber 20 at the receive section 30. In the receive section 30, the light-receiving device 31 converts the optical FM signal into an electric signal. Following this, the second amplifying circuit 32 amplifies the electric FM signal, and the FM demodulator 33 demodulates the amplified FM signal into the original AM signal.

The FM demodulator 33 is a delaying type FM demodulator. Concretely, the FM demodulator 33 detects the rise (or fall) of an FM signal to generate a pulse with constant width, as an output signal, a voltage corresponding to the pulse density of this pulse. Since the amplitude (voltage) of this output signal is proportional to the frequency of an FM signal, the FM demodulator 33 converts the FM signal into the original AM signal.

In the foregoing signal transmission system, in the case of transmission of a broadband FM signal, a group delay deviation according to frequency arises in the first amplifying circuit 12, the semiconductor laser 13, the light-receiving device 31 and the second amplifying circuit 32. When passing through these components, a phase delay of an FM signal occurs according to frequency. In consequence, at the FM demodulation, the timing of the rise (or fall) of an FM signal shifts to develop a distortion of an AM signal obtained through the demodulation, thus causing degradation of transmission quality.

Also, this problem arises in the case of the modulation of an AM signal into a PM signal and subsequent demodulation of the PM signal into the original AM signal, and for the modulation of a QAM signal, instead of the AM signal, into an FM signal or PM signal and subsequent demodulation into the original QAM signal.

SUMMARY OF THE INVENTION

Accordingly, it is therefore an object of the present invention to provide a signal transmission system capable of suppressing the distortion of a demodulated AM signal or QAM signal with simple configuration.

For this purpose, in accordance with a first aspect of the present invention, there is provided a signal transmission system comprising modulating means for modulating one of an AM signal and a QAM signal into one of an FM signal and a PM signal, demodulating means for demodulating the FM signal or the PM signal into the original AM signal or QAM signal, group delay deviation producing means placed between the modulating means and the demodulating means for producing a group delay deviation on the FM signal or the PM signal, harmonic producing means placed on the upstream side of the demodulating means for producing a harmonic of the FM signal or PM signal to superimpose the harmonic on the FM signal or the PM signal, and harmonic phase shifting means placed on the upstream side of the demodulating means for shifting a phase of the harmonic from the harmonic producing means to compensate the group delay deviation.

Thus, a harmonic is superimposed on an FM signal or PM signal and the phase of this harmonic is shifted, which suppress the distortion of a demodulated AM signal or QAM signal.

In this signal transmission system, it is also appropriate that the aforesaid harmonic phase shifting means has a function to adjust a harmonic phase shifting quantity. This can further suppress the distortion of the AM signal or QAM signal by adjusting the harmonic phase shift.

In accordance with another aspect of the present invention, there is provided a signal transmission system comprising modulating means for modulating one of an AM signal and a QAM signal into one of an FM signal and a PM signal, demodulating means for demodulating the FM signal or the PM signal into the original AM signal or QAM signal, group delay deviation producing means placed between the modulating means and the demodulating means for producing a group delay deviation on the FM signal or the PM signal, harmonic producing means placed on the upstream side of the demodulating means for producing a harmonic of the FM signal or PM signal to superimpose the harmonic on the FM signal or the PM signal, and harmonic level changing means placed on the upstream side of the demodulating means for changing a level of the harmonic from the harmonic producing means to compensate the group delay deviation.

This also exhibits a signal distortion suppressing effect similar to that of the first-mentioned signal transmission system by means of the change of harmonic level.

In this signal transmission system, it is also appropriate that the harmonic level changing means has a function to adjust a harmonic level.

In these signal transmission systems, it is also appropriate that the modulating means functions additionally as the harmonic producing means. In this case, since the modulating means also acts as the harmonic producing means, the simplification of the circuit arrangement becomes feasible.

In addition, it is also appropriate that the modulating means is designed to generate a pulsed FM signal or PM signal. In this case, since the modulating means generates a pulsed output, the harmonic is easily attainable.

Furthermore, in these signal transmission systems, first amplifying means, a light-emitting device for converting an electric signal into an optical signal, a light-receiving device for converting an optical signal into an electric signal and a second amplifying means are provided in sequence from the modulating means to the demodulating means, and at least one of the first amplifying means, the light-emitting device, the light-receiving device and the second amplifying means serves as the group delay deviation producing means, while at least one of the first amplifying means, the light-emitting device, the light-receiving device and the second amplifying means serves as the harmonic producing means.

In this case, the simplification of the circuit arrangement becomes feasible because a component to be usually employed for optical transmission also functions as the harmonic producing means.

Still furthermore, in the first-mentioned signal transmission system, first amplifying means, a light-emitting device for converting an electric signal into an optical signal, a light-receiving device for converting an optical signal into an electric signal and a second amplifying means are provided in sequence from the modulating means to the demodulating means, and at least one of the first amplifying means, the light-emitting device, the light-receiving device and the second amplifying means serves as the group delay deviation producing means, while at least one of the first amplifying means, the light-emitting device, the light-receiving device and the second amplifying means serves as the harmonic phase shifting means.

Likewise, in this case, the simplification of the circuit arrangement becomes feasible because a component to be usually employed for optical transmission also functions as the harmonic phase shifting means.

Furthermore, according to the present invention, in a signal transmission apparatus for transmitting an input signal comprises modulating means for modulating the input signal, group delay deviation producing means for producing a group delay deviation on the modulated input signal, harmonic producing means placed on the downstream side of the modulating means for producing a harmonic of the modulated input signal to superimpose the harmonic on the modulated input signal, and harmonic phase shifting means placed on the downstream side of the modulating means for shifting a phase of the harmonic from the harmonic producing means to compensate the group delay deviation.

Still furthermore, according to the present invention, in a signal transmission apparatus, a receive section for receiving a signal comprises demodulating means for demodulating the signal, group delay deviation producing means placed on the upstream side of the demodulating means for producing a group delay deviation on the signal, harmonic producing means placed on the upstream side of the demodulating means for producing a harmonic of the modulated input signal to superimpose the harmonic on the signal, and harmonic phase shifting means placed on the upstream side of the demodulating means for shifting a phase of the harmonic from the harmonic producing means to compensate the group delay deviation.

Moreover, according to the present invention, in a signal transmission apparatus for transmitting an input signal comprises modulating means for modulating the input signal, group delay deviation producing means for producing a group delay deviation on the modulated input signal, harmonic producing means placed on the downstream side of the modulating means for producing a harmonic of the modulated input signal to superimpose the harmonic on the modulated input signal, and harmonic level changing means placed on the downstream side of the modulating means for changing a level of the harmonic from the harmonic producing means to compensate the group delay deviation.

Still moreover, according to the present invention, in a signal transmission apparatus, a receive section for receiving a signal comprises demodulating means for demodulating the signal, group delay deviation producing means placed on the upstream side of the demodulating means for producing a group delay deviation on the signal, harmonic producing means placed on the upstream side of the demodulating means for producing a harmonic of the modulated input signal to superimpose the harmonic on the signal, and harmonic level changing means placed on the upstream side of the demodulating means for changing a level of the harmonic from the harmonic producing means to compensate the group delay deviation.

In addition, according to the present invention, a signal transmission apparatus comprises modulating means for modulating a first signal into a second signal, demodulating means for demodulating the second signal into the original first signal, group delay deviation producing means placed between the modulating means and the demodulating means for producing a group delay deviation on the second signal, and harmonic phase shifting means placed on the upstream side of the demodulating means for shifting a phase of the second signal to compensate the group delay deviation.

Still additionally, according to the present invention, a signal transmission apparatus comprises modulating means for modulating a first signal into a second signal, demodulating means for demodulating the second signal into the original first signal, group delay deviation producing means placed between the modulating means and the demodulating means for producing a group delay deviation on the second signal, and harmonic level changing means placed on the upstream side of the demodulating means for changing a level of the second signal to compensate the group delay deviation.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Figure 1:
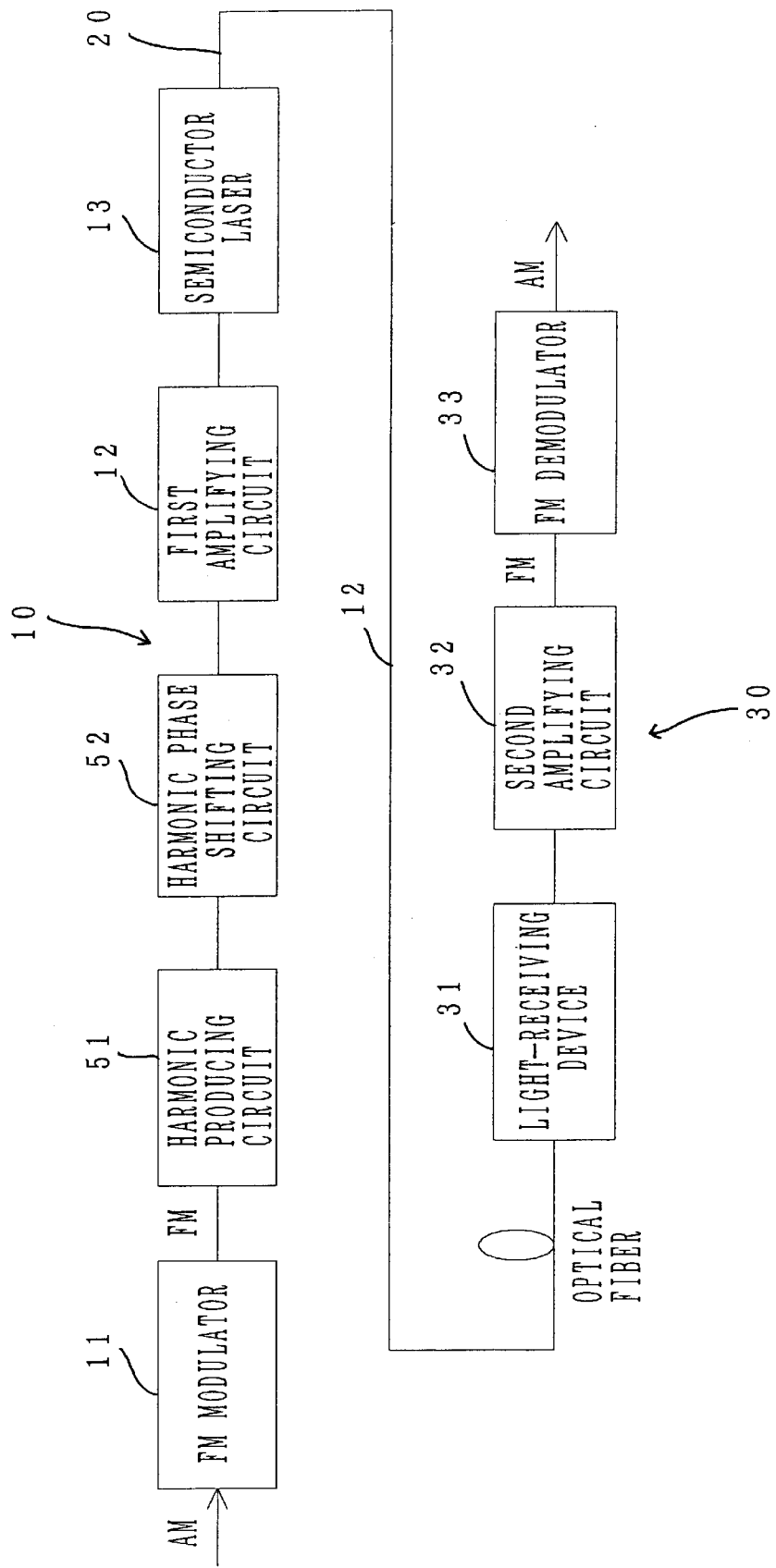
FIG. 1 is a block diagram showing a circuit constituting a signal transmission system according to an embodiment of the present invention.
Figure 3:
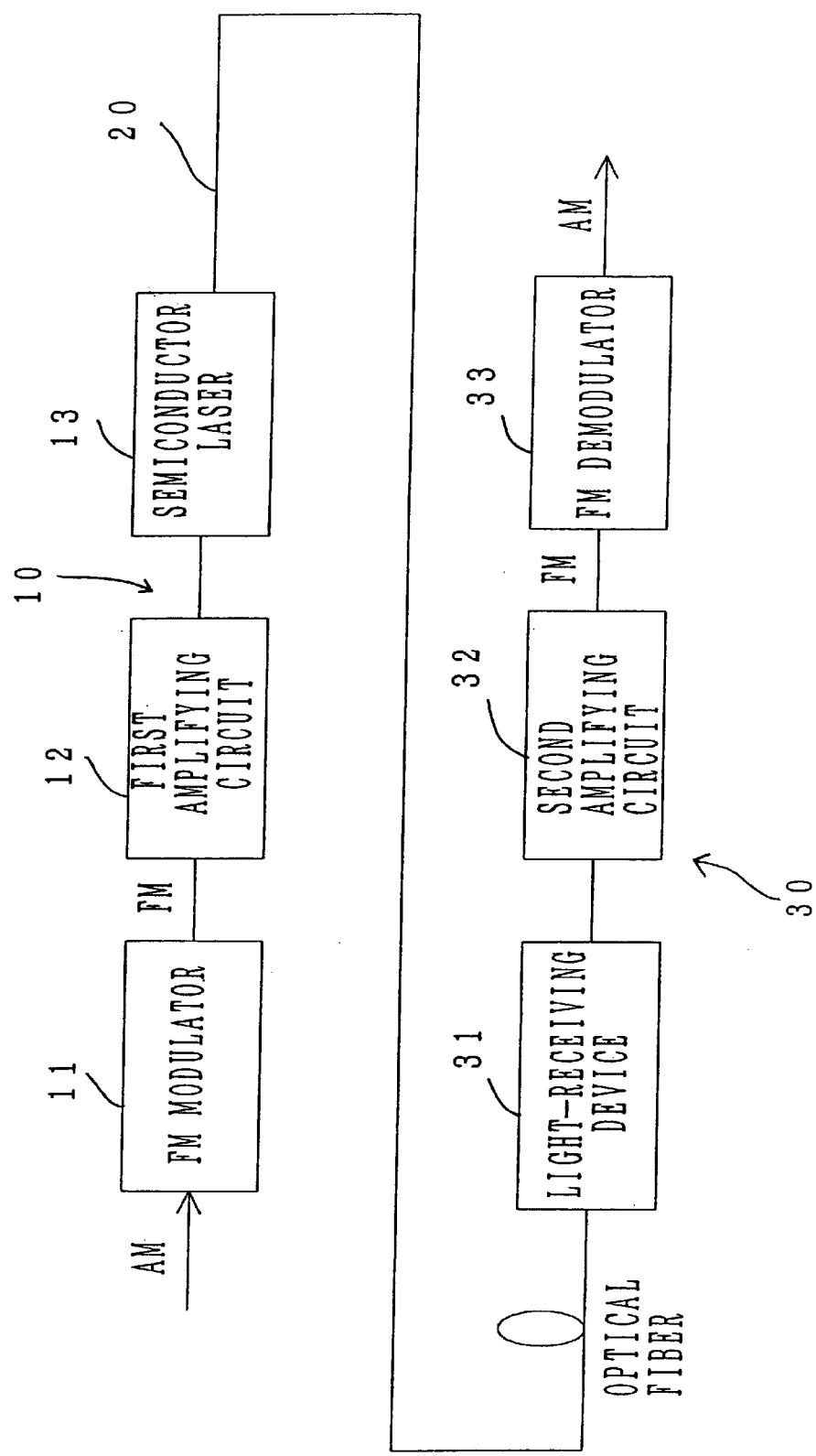
FIG. 3 is a block diagram showing a circuit constituting a conventional signal transmission system.

Referring now to FIG. 1, a description will be given hereinbelow of a signal transmission system according to an embodiment of the present invention. The signal transmission system shown in FIG. 1 includes all the configurations of the conventional signal transmission system shown in FIG. 3, and the same parts are marked with the same reference numerals in the illustration, with the description thereof being omitted for brevity. In this system, the original AM signal to be modulated includes multi-channel video signal as with the conventional system.

Figure 2:
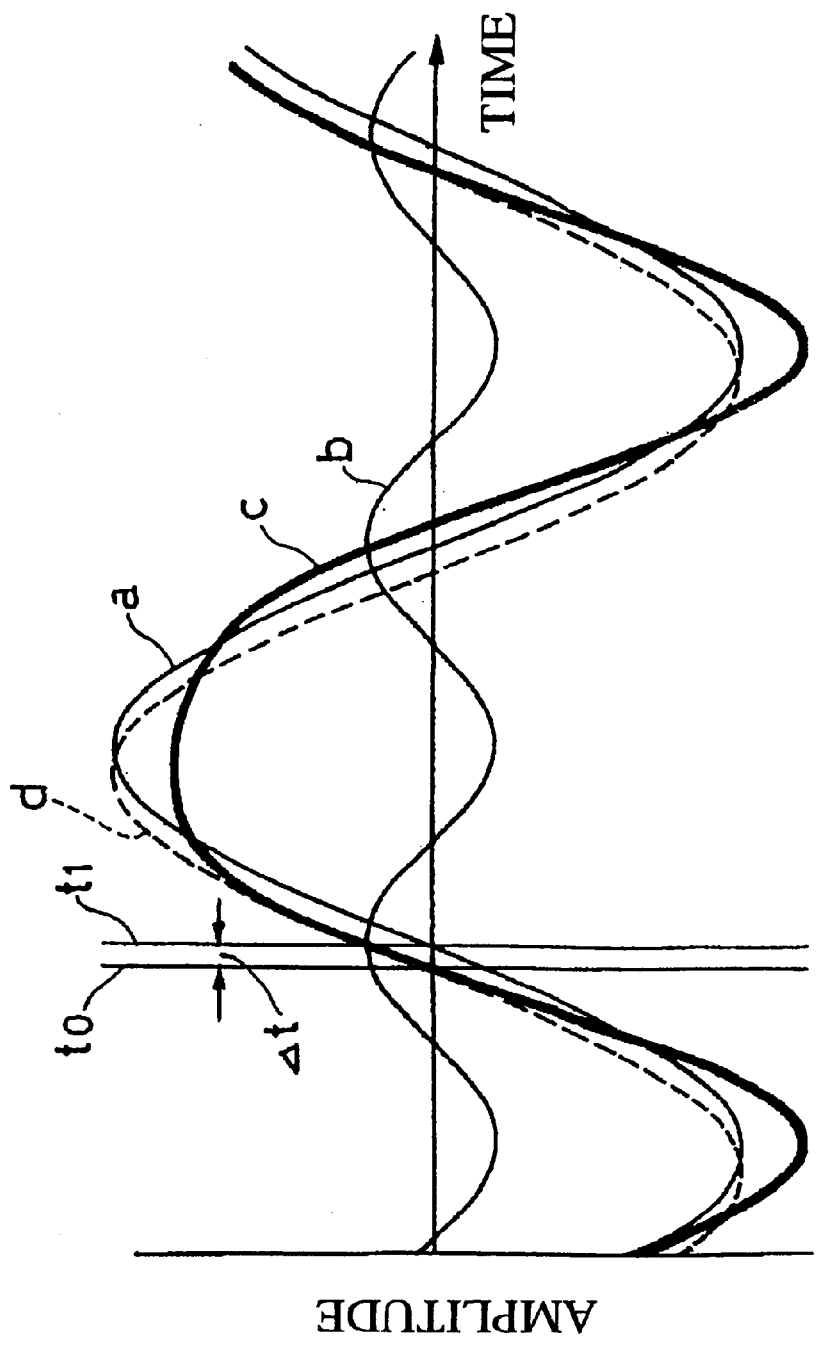
FIG. 2 is an illustration of signal waveforms useful for explaining an operation of this signal transmission system.

In the system according to this embodiment, in a transmission section or apparatus 10, between an FM modulator 11 and a first amplifying circuit 12, there exist a harmonic producing circuit 51 (harmonic producing means) and a harmonic phase shifting circuit 52 (harmonic phase shifting means) in the order named, from the upstream side to the downstream side. The harmonic producing circuit 51 produces a harmonic of an FM signal from the FM modulator 11, for example, a second harmonic to superimpose this harmonic on the FM signal. In this embodiment, as FIG. 2 shows, supposing that the FM signal from the FM modulator 11 is formed with a sinewave or a fundamental wave a close thereto, the harmonic producing circuit 51 superimposes a harmonic b thereon to positively distort the fundamental wave a from the FM modulator 11, thereby providing a superimposed wave c.

The harmonic phase shifting circuit 52 receives an FM signal based on this superimposed wave c to shift the phase of the harmonic b included in the superimposed wave c for changing the shape of the superimposed wave c.

A detailed description will be given hereinbelow of an operation of the signal transmission system with the above-described arrangement.

The FM signal is, for example, in a frequency band of 1 GHz to 6 GHz. When the FM signal lying in this frequency band passes through a first amplifying circuit 12, a semiconductor laser 13, a light-receiving device 31 and a second amplifying circuit 32, a group delay deviation develops stemming from frequency. As one example of this group delay characteristic, the phase delays are almost identical for 1 GHz to 3 GHz (hereinafter, this frequency band will be referred to as a "first band", which shows a sufficient frequency flatness. On the other hand, sometimes, as the frequency increases after exceeding 3 GHz, more phase delay tends to occur (hereinafter, this range will be referred to as a "second band"). If the phase delays are equal to each other even though the frequencies differ, an AM signal to be obtained through demodulation is equal to the original one in waveform, where no distortion occurs. On the contrary, when a difference in phase delay occurs according to frequency as mentioned above, an AM signal produced through demodulation develops distortion.

For this reason, in this embodiment, the harmonic producing circuit 51 and the harmonic phase shifting circuit 52 are incorporated into the system for compensate the aforesaid group delay deviation, which eliminates the distortion of the AM signal after the demodulation.

In the following detailed description of these circuits 51 and 52, for simplicity of discussion only, a harmonic producing function to distort a waveform and a phase shifting function to shift a phase of a harmonic, which reside in the first amplifying circuit 12, the semiconductor laser 13, the light-receiving device 31 and the second amplifying circuit 32, are not taken into consideration.

The harmonic producing circuit 51 does not generate a harmonic when the frequency of an FM signal is in the foregoing first band, while generating a second harmonic corresponding to the frequency at that time when the FM signal frequency is in the foregoing second band.

Referring again to FIG. 2, a waveform denoted at a broken line d represents a waveform of an FM signal belonging to the first band, and is assumed to be equal in phase delay to a frequency signal in the first band. In the illustration, the time point of rising of this assumed waveform d is indicated as time t0. Thus, as with a frequency signal in the first band, when the rise timing is the time t0, a distortion does not appear in an AM signal after the demodulation. However, in fact, the fundamental wave a of an FM signal with a frequency pertaining to the second band shows a large phase delay, with the result that the rise timing shifts to a time t1. The time width (length) Δt between these times t0 and t1, that is, a phase delay deviation between the frequencies is cancelable as follows.

In the harmonic producing circuit 51, the harmonic b is superimposed on the fundamental wave a to distort the fundamental wave a, and in the harmonic phase shifting circuit 52, the waveform of the superimposed wave (wave after the superimposition) c is controlled by adjusting a phase shifting quantity (phase shift) of the harmonic b superimposed thereon so that the rise timing of the superimposed wave c coincides with the rise timing t0 of the aforesaid assumed waveform d (that is, the phase delay deviation Δt is reduced to zero); in consequence, the distortion of an AM signal to be obtained through the demodulation is cancelable to assure accurate transmission of multi-channel video information.

Preferably, the phase shifting quantity data needed for adjusting the rise timing to the time to is accumulated in advance according to frequency through experiments or calculations so that the harmonic phase shifting circuit 52 changes the harmonic phase shifting quantity on the basis of these data.

The present invention is not limited to the above description, and includes various modifications. For example, it is also appropriate that other components such as the first amplifying circuit 12 intervenes between the harmonic producing circuit 51 and the harmonic phase shifting circuit 52. In addition, it is also possible that these circuits 51 and 52 are provided in the receive section 30.

When the FM modulator generates harmonic, the harmonic producing circuit 51 is omissible in this case. This is because, in the FM signal from the FM modulator 11, a harmonic is superimposed on the fundamental wave forming a sinewave, and the FM modulator 11 also functions as the harmonic producing means. For example, in a case in which the FM modulator 11 outputs a rectangular pulse, a plurality of odd-number-order harmonics are included in the FM signal output.

Taking into consideration the fact the first amplifying circuit 12, the semiconductor laser 13, the light-receiving device and the second amplifying circuit 32 distort the waveform of the FM signal, it is also possible that at least of these components is used as the harmonic producing means. Even in this case, the harmonic producing circuit 51 is omissible. Also in this case, there is a need to place the harmonic phase shifting means on the downstream side of the component used as the harmonic producing means. In this connection, if the harmonic level in these components is low, a means for amplifying it can be incorporated thereinto.

In the above-described embodiment and modifications, it is also appropriate that the harmonic phase shifting means is replaced with a harmonic level changing means, or that a harmonic level changing means is added to the harmonic phase shifting means. This is because the change of the harmonic level can also change the waveform of the superimposed wave c, thus changing the rise timing thereof. In order to precisely set the rise timing at the time point t0, the harmonic level changing means can be designed to be capable of adjusting the harmonic level according to frequency.

In addition, instead of being automatically conducted according to frequency, it is also acceptable to manually conduct the phase shifting in the harmonic phase shifting means and the level adjustment in the harmonic level changing means. This is accomplished simply by adjusting the phase delay deviation to zero with respect to a specified frequency. This adjustment can be made while seeing the real picture on a monitor on the receive side.

Although the phase delay deviation can be adjusted to zero with respect to a specified frequency when the phase shift or the level change is in a fixed condition, it is also possible to reduce the phase delay deviation on frequencies therearound.

The harmonic producing means also can output harmonics throughout the entire frequency band of the FM signal, or can output a harmonic with respect to a specified frequency of the FM signal. Even in the latter case, the phase delay deviation is reducible. In a case in which the harmonic producing means generates a plurality of harmonics, it is also appropriate that the harmonic phase shifting means or the harmonic level changing means performs the phase shift or the level change on a plurality of harmonics.

It is also possible that, before superimposing a harmonic on an FM signal or PM signal, the harmonic phase shifting means or the harmonic level changing means shifts the phase of the harmonic or changes the level of the harmonic.

It is also appropriate that the first amplifying circuit 12, the semiconductor laser 13, the light-receiving device 31 or the second amplifying circuit 32 can be used as a phase shifting means for shifting the phase of a harmonic according to a fixed shifting quantity.

It is also acceptable that the demodulating means is designed to perform the demodulation through the use of a delay detection method of outputting a pulse at a rise timing of a waveform.

Moreover, in the present invention, it is also appropriate that an AM signal is modulated by the modulating means into a PM signal which in turn, is demodulated into the former AM signal in the demodulating means, or that, instead of the AM signal, a QAM signal is modulated into an FM signal or PM signal which in turn, is demodulated into the original QAM signal in the demodulating means.

It should be understood that the present invention is not limited to the above-described embodiment, and that it is intended to cover all changes and modifications of the embodiment of the invention herein which do not constitute departures from the spirit and scope of the invention.

What is claimed is:

1. A signal transmission system comprising:
   modulating means for modulating a first signal into a second signal;
   demodulating means for demodulating said second signal into the original first signal;
   group delay deviation producing means placed between said modulating means and said demodulating means for producing a group delay deviation on said second signal;
   harmonic producing means placed on the upstream side of said demodulating means for producing a harmonic of said second signal to superimpose said harmonic on said second signal; and
   harmonic phase shifting means placed on the upstream side of said demodulating means for shifting a phase of said harmonic from said harmonic producing means to compensate said group delay deviation.

2. A signal transmission system according to claim 1, wherein said harmonic phase shifting means has a function to adjust a harmonic phase shifting quantity.

3. A signal transmission system according to claim 1, wherein said modulating means functions additionally as said harmonic producing means to produce said harmonic of said second signal.

4. A signal transmission system according to claim 1, wherein said modulating means is designed to generate said second signal pulsed.

5. A signal transmission system according to claim 1, further comprising first amplifying means, a light-emitting device for converting an electric signal into an optical signal, a light-receiving device for converting an optical signal into an electric signal and a second amplifying means in the order from said modulating means to said demodulating means,
   at least one of said first amplifying means, said light-emitting device, said light-receiving device and said second amplifying means functioning as said group delay deviation producing means, while at least one of said first amplifying means, said light-emitting device, said light-receiving device and said second amplifying means functioning as said harmonic producing means.

6. A signal transmission system according to claim 1, further comprising first amplifying means, a light-emitting device for converting an electric signal into an optical signal, a light-receiving device for converting an optical signal into an electric signal and a second amplifying means in the order from said modulating means to said demodulating means,
   at least one of said first amplifying means, said light-emitting device, said light-receiving device and said second amplifying means functioning as said group delay deviation producing means, while at least one of said first amplifying means, said light-emitting device, said light-receiving device and said second amplifying means functioning as said harmonic phase shifting means.

7. A signal transmission system comprising:
   modulating means for modulating a first signal into a second signal;
   demodulating means for demodulating said second signal into the original first signal;
   group delay deviation producing means placed between said modulating means and said demodulating means for producing a group delay deviation on said second signal;
   harmonic producing means placed on the upstream side of said demodulating means for producing a harmonic of said second signal to superimpose said harmonic on said second signal; and
   harmonic level changing means placed on the upstream side of said demodulating means for changing a level of said harmonic from said harmonic producing means to compensate said group delay deviation.

8. A signal transmission system according to claim 3, wherein said harmonic level changing means has a function to adjust a harmonic level.

9. A signal transmission system according to claim 3, wherein said modulating means functions additionally as said harmonic producing means to produce said harmonic of said second signal.

10. A signal transmission system according to claim 3, wherein said modulating means is designed to generate said second signal pulsed.

11. A signal transmission system according to claim 3, further comprising first amplifying means, a light-emitting device for converting an electric signal into an optical signal, a light-receiving device for converting an optical signal into an electric signal and a second amplifying means in the order from said modulating means to said demodulating means, at least one of said first amplifying means, said light-emitting device, said light-receiving device and said second amplifying means functioning as said group delay deviation producing means, while at least one of said first amplifying means, said light-emitting device, said light-receiving device and said second amplifying means functioning as said harmonic producing means.

12. A signal transmission apparatus for transmitting an input signal, said transmission apparatus comprising:

modulating means for modulating said input signal;

group delay deviation producing means for producing a group delay deviation on the modulated input signal;

harmonic producing means placed on the downstream side of said modulating means for producing a harmonic of the modulated input signal to superimpose said harmonic on the modulated input signal; and harmonic phase shifting means placed on the downstream side of said modulating means for shifting a phase of said harmonic from said harmonic producing means to compensate said group delay deviation.

13. A signal transmission apparatus having a receive section for receiving a signal, said receive section comprising:

demodulating means for demodulating said signal;

group delay deviation producing means placed on the upstream side of said demodulating means for producing a group delay deviation on said signal;

harmonic producing means placed on the upstream side of said demodulating means for producing a harmonic of the modulated input signal to superimpose said harmonic on said signal; and harmonic phase shifting means placed on the upstream side of said demodulating means for shifting a phase of said harmonic from said harmonic producing means to compensate said group delay deviation.

14. A signal transmission apparatus for transmitting an input signal, said transmission apparatus comprising:

modulating means for modulating said input signal;

group delay deviation producing means for producing a group delay deviation on the modulated input signal; and harmonic producing means placed on the downstream side of said modulating means for producing a harmonic of the modulated input signal to superimpose said harmonic on the modulated input signal; and harmonic level changing means placed on the downstream side of said modulating means for changing a level of said harmonic from said harmonic producing means to compensate said group delay deviation.

15. A signal transmission apparatus having a receive section for receiving a signal, said receive section comprising:

demodulating means for demodulating said signal;

group delay deviation producing means placed on the upstream side of said demodulating means for producing a group delay deviation on said signal;

harmonic producing means placed on the upstream side of said demodulating means for producing a harmonic of the modulated input signal to superimpose said harmonic on said signal; and harmonic level changing means placed on the upstream side of said demodulating means for changing a level of said harmonic from said harmonic producing means to compensate said group delay deviation.

16. A signal transmission apparatus comprising:

modulating means for modulating a first signal into a second signal;

demodulating means for demodulating said second signal into the original first signal;

group delay deviation producing means placed between said modulating means and said demodulating means for producing a group delay deviation on said second signal; and harmonic phase shifting means placed on the upstream side of said demodulating means for shifting a phase of said second signal to compensate said group delay deviation.

17. A signal transmission apparatus according to claim 16, further comprising harmonic producing means placed on the upstream side of said demodulating means for producing a harmonic of said second signal to superimpose said harmonic on said second signal so that said harmonic phase shifting means shifts a phase of said harmonic from said harmonic producing means to compensate said group delay deviation.

18. A signal transmission apparatus comprising:

modulating means for modulating a first signal into a second signal;

demodulating means for demodulating said second signal into the original first signal;

group delay deviation producing means placed between said modulating means and said demodulating means for producing a group delay deviation on said second signal; and harmonic level changing means placed on the upstream side of said demodulating means for changing a level of said second signal to compensate said group delay deviation.

19. A signal transmission apparatus according to claim 18, further comprising harmonic producing means placed on the upstream side of said demodulating means for producing a harmonic of said second signal to superimpose said harmonic on said second signal so that harmonic level changing means changes a level of said harmonic from said harmonic producing means to compensate said group delay deviation.

* * * * *